United States Patent [19]

Lindow

[11] Patent Number: 4,571,133
[45] Date of Patent: Feb. 18, 1986

[54] LOADING WASHER ASSEMBLY

[75] Inventor: Dale W. Lindow, Marine City, Mich.

[73] Assignee: General Motors Corporation, Detroit, Mich.

[21] Appl. No.: 633,695

[22] Filed: Jul. 23, 1984

[51] Int. Cl.$^4$ .................... F16B 31/04; F16B 39/24
[52] U.S. Cl. .................... 411/11; 411/150; 411/155; 411/544
[58] Field of Search .................... 411/6, 8, 9, 10, 11, 411/12, 13, 14, 136, 137, 138, 139, 149, 150, 154, 155, 156, 533, 535, 536, 544, 545

[56] References Cited

U.S. PATENT DOCUMENTS

| 183,324 | 10/1876 | Pratt | 411/150 X |
|---|---|---|---|
| 292,063 | 1/1884 | Shailer | 411/150 X |
| 360,091 | 3/1887 | Gienty | 411/136 |
| 1,394,740 | 10/1921 | Klocke | 411/136 |
| 2,943,528 | 7/1960 | Curry | 411/11 |
| 3,280,689 | 10/1966 | Rubin | 411/6 |
| 3,285,120 | 11/1966 | Kartiaca | 411/8 |
| 3,474,701 | 10/1969 | Setzler | 411/8 |
| 3,631,910 | 1/1972 | Crowther et al. | 411/149 |
| 3,884,457 | 5/1975 | Leko | 411/544 X |
| 4,072,081 | 2/1978 | Curtis et al. | 411/10 |

FOREIGN PATENT DOCUMENTS

| 891650 | 12/1943 | France | 411/149 |
|---|---|---|---|
| 1097266 | 2/1955 | France | 411/150 |
| 1175494 | 11/1958 | France | 411/150 |
| 1396297 | 3/1965 | France | 411/149 |
| 431639 | 7/1935 | United Kingdom | 411/155 |

Primary Examiner—Thomas J. Holko
Attorney, Agent, or Firm—Arthur N. Krein

[57] ABSTRACT

A loading washer assembly includes an annular first washer provided with spaced apart ears on its outer peripheral edge with each of the ears having a return bent portion at its free end, an annular second washer provided with spaced apart notches on its outer peripheral edge for slidably receiving the ears whereby to prevent relative rotation of said washers, the return bent portions of the ears limiting the axial extent of separation of these washers. Each of the washers on their opposed surfaces have circumferentially spaced apart, radial extending raised ribs with the ribs on the first washer rotatively offset from the ribs on the second washer. A normally flat spring ring is interposed between the first washer and the second washer in position so as to be engaged by the opposed sets of ribs whereby the spring ring will be deformed into a wave-like spring upon axial displacement of the first washer toward the second washer.

3 Claims, 7 Drawing Figures

LOADING WASHER ASSEMBLY

This invention relates to washers as used with threaded fasteners and, in particular, to a loading washer assembly having a wave spring therein.

DESCRIPTION OF THE PRIOR ART

As is well known, washers perform a number of functions in fastener assemblies. The major function of a washer is to serve as a seat for bolts, nuts and screws so as to distribute load over an area greater than that provided by the fastener head bearing surface. In addition, a washer also serves so as to act as a spring take-up between, for example, a bolt and the associate workpiece and to prevent movement between parts.

In certain applications, as when a fastener is used in an internal combustion engine to effect retention, for example, of a rocker arm cover to a cylinder head with a gasket sandwiched therebetween, it is also known to use a washer assembly, consisting of a steel washer and a thick compression washer of rubber-like material with an associated threaded fastener, the rubber washer being operative after torque down of the fastener so as to effect application of a force against the rocker arm cover in a direction whereby to continually compress the gasket material as it ages due to the environment in which it must operate. However, after an extended period of time in such an operational environment, the rubber-like material of the compression washer will also loose its resiliency and thus loose its ability to maintain the gasket in sealing relationship against either the rocker arm cover or the cylinder head, or both.

SUMMARY OF THE INVENTION

The present invention provides a loading washer assembly that includes a pair of axially spaced apart, rigid washers, the opposed surfaces of which are provided with circumferentially spaced apart, radial upstanding ribs, the ribs of one washer being angularly offset relative to the other washer, and a normally flat ring spring is positioned between the washers so as to be engaged by the ribs thereof, whereby during torque down of an associate threaded fastener, axial movement of the washers toward each other will deform the ring spring into a wave spring which will then be operative to apply a bias force on the washers in a washer separating direction.

It is therefore a primary object of this invention to provide an improved loading washer assembly that contains a pair of rigid, ribbed washers with a normally flat, ring spring positioned therebetween so as to be deformed into a wave-spring upon axial displacement of the washer toward each other whereby to spring load these washers.

Another object of the invention is to provide an improved loading washer assembly having a washer-like spring operatively positioned between a pair of rigid, ribbed washers, one of which has upstanding legs slidably received in notches provided in the other washer whereby the washers and the washer-like spring are held together in unit assembly and are fixed against rotation relative to each other so that the washer spring can be deformed into a wave-spring.

For a better understanding of the invention, as well as other objects and further features thereof, reference is had to the following detailed description of the invention to be read in connection with the accompanying drawings.

Figure 1:
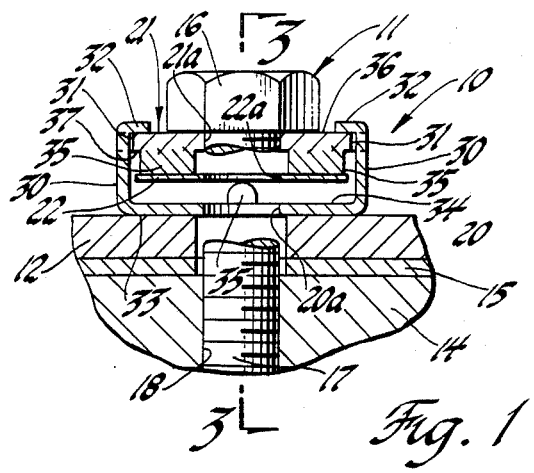
FIG. 1 is a sectional view of a portion of an internal combustion engine having a loading washer assembly in accordance with the invention incorporated therein, the loading washer being shown in its as assembled position prior to torque down of the associate screw.
Figure 2:
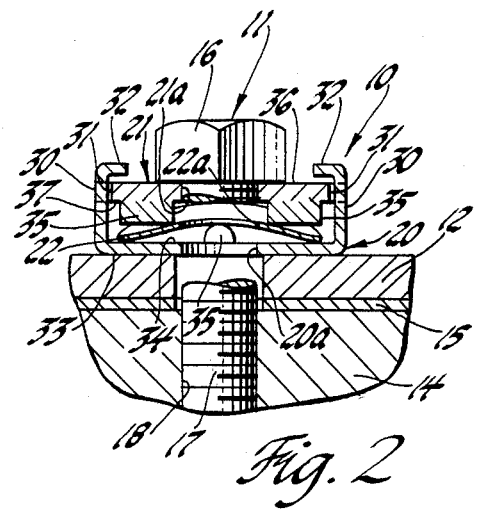
FIG. 2 is a sectional view similar to FIG. 1, but showing the elements of the loading washer in the torqued down position.

Referring first to FIGS. 1 and 2, a loading washer assembly 10, in accordance with the invention, is shown, for purpose of illustration, as being used with a threaded fastener such as machine screw 11 to secure a pair of workpieces such as a rocker arm cover 12 to the cylinder head 14 of an engine, not shown, with a gasket 15 sandwiched between these workpieces. The machine screw 11 is of a conventional configuration, as desired, and in the construction shown has a hexagonal head 16 with a threaded shank 17 depending therefrom that is engaged in an internally threaded bore 18 provided for this purpose in the cylinder head 14.

A preferred embodiment of a loading washer assembly 10 is shown in FIGS. 1-4, and includes a rigid first or base washer 20, a rigid second or upper washer 21 and an intermediate washer or ring-like spring 22, the latter, preferably as assembled, being of a flat configuration but which is adapted, during torque down of the machine screw 11, to be deformed into a wave-spring configuration in a manner to be described in detail hereinafter.

The washers 20 and 21, as conventional, and the spring 22 are each provided with a central aperture 20a, 21a and 22a, respectively, each of a suitable diameter so as to loosely receive the shank 17 of an associate machine screw 11 and, of course, the washers 20 and 21 are each of suitable external diameter relative to the associate threaded fastener 11 so as to serve its load distribution function in a manner well known in the fastener art.

These elements of the loading washer assembly are preferably, suitably held together in unit assembly. In the embodiment illustrated, this is accomplished by means of at least a pair of circumferentially spaced apart legs 30, each of which extends integrally upward from the outer peripheral edge of the base washer 20 so as to be each slidably received in notches or slots 31 provided for this purpose in the outer peripheral edge of the upper washer 21, with the free end of each leg 30 being bent radially inward to define a retainer tab 32 extending over the upper washer 21. With this arrangement, the base washer 20, spring 22 and upper washer 21 are held together in unit assembly and these washers are also thus fixed against rotation relative to each other.

Figure 3:
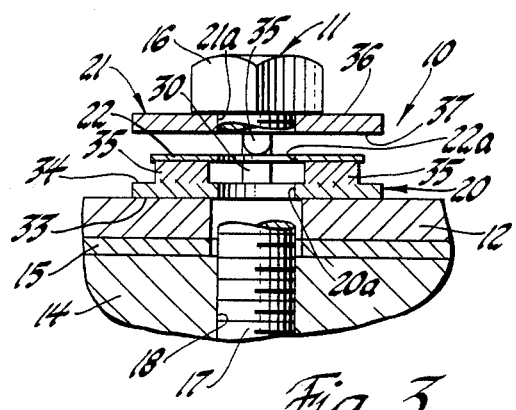
FIG. 3 is a cross-sectional view of the engine with loading washer assembly taken along line 3—3 of FIG. 1.
Figure 4:
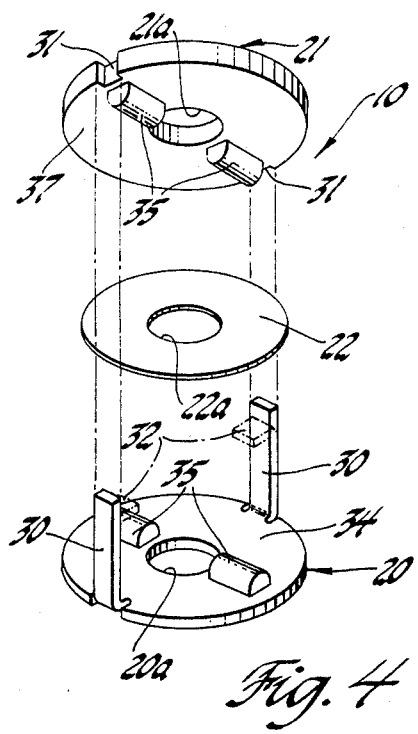
FIG. 4 is an exploded view of the loading washer assembly, per se, of FIG. 1.

As best seen in FIGS. 1-3, the base washer 20 has a lower or outboard planar bearing surface 33 for abutment against the surface of a workpiece, such as the rocker arm cover 12, while its opposite or inboard surface 34 is provided with circumferentially, equally spaced apart, radial extending, raised ribs 35, two such ribs being used in this illustrated embodiment, and they are located radially outward of the aperture 20a.

In a somewhat similar manner, the upper washer 21 has an outboard or upper planar surface 36 for abutment against the lower bearing face of the head 16 of the machine screw 11, while its inboard or opposite surface 37 is provided with a corresponding number of circumferentially spaced apart, radial extending, raised ribs 35 arranged so as to be angularly offset relative to the ribs 35 on the base washer 20. Thus, for example, in this FIG. 1-4 embodiment, by proper orientation of the ribs 35 on the base washer 20 relative to the legs 30 thereof and by proper orientation of the ribs 35 on the upper washer 21 relative to the slots 31, these washers 20, 21 when assembled together will have the ribs 35 on one washer offset approximately 90° relative to the ribs on the other washer.

The axial extent of the legs 30 of the base washer 20 are preselected relative to the axial extent of the opposed sets of ribs 35 and the thickness of the spring 22 so that this spring 22 can preferably be installed between the opposed sets of ribs 35 in its, as formed, normal flat configuration, the as assembled condition shown in FIG. 1. Thus, as preferably assembled, the spring 22 will then not be operative to apply a bias force against the washers 20, 21 in an axial washer separating direction until it is assembled to a fastener that is then torqued down.

However, the subject loading washer assembly 10 arrangement is such that as the upper washer 21 is moved axially toward the base washer 20, the opposed sets of ribs 35 engaging opposite sides of the spring 22 will effect deformation of this spring into a wave-spring configuration such that this now wave-spring will then be operative to apply a bias force against the washers 20, 21 in an axial washer separating direction.

Thus in the operation of the loading washer assembly 10, as the machine screw 11, for example, is torqued down from its position shown in FIG. 1 to the position shown in FIG. 2, the upper washer 21 will be moved axially toward the base washer 20 so that the spring 22 will be deformed from its flat, as assembled, condition shown in FIG. 1 into a wave-spring configuration, as shown in FIG. 2. That is, as the offset sets of ribs 35 engage opposite sides of the spring 22 and are advanced axially toward each other they will deform the spring 22 so as to form corresponding hills and valleys of increased amplitude with corresponding increase in the bias force of the spring 22 that is applied against the opposed washers. Of course, in the meantime, as the machine screw 11 is torqued down, the rocker arm cover 12 is moved toward the cylinder head 14 so that the gasket 15 therebetween will be compressed into sealing engagement with the opposed surfaces of these workpieces, that is, the opposed surfaces of the rocker arm cover 12 and cylinder head 14.

Accordingly, after the required torque down of the machine screw 30 to effect this sealing engagement of the gasket with the opposed surfaces of the workpieces and, of course, in the meantime effecting deformation of the spring 22 into the wave-shape shown in FIG. 2, the head 16 of the machine screw 11 will then be fixed relative to the cylinder head 14 workpiece. This then permits the wave spring 22 to continuously apply a bias force against the rocker arm cover workpiece 12 via the base washer 20 whereby to apply a continuous compressive load on the gasket 15. Thus even if the gasket 15 looses some of its resiliency over an extended period of time, as due, for example, to aging of the material from which it was fabricated, the continued bias force applied by the wave-spring 22 will be operative so as to maintain the gasket 15 in sealing engagement against the opposed surfaces of the workpieces.

As should now be apparent to those skilled in the art, the height of the ribs 35 and, the material (material and heat treatment) and the thickness of the spring 22 can be preselected, as desired, for a given application, whereby a predetermined maximum spring bias force can be obtained by torque down of the machine screw 11 to a point at which the spring 22 is waved so that it just contacts the inboard surfaces 34, 37 of the washers 20, 21, respectively, between the ribs 35 thereon, the position of the wave-spring washer shown in FIG. 2.

Figure 5:
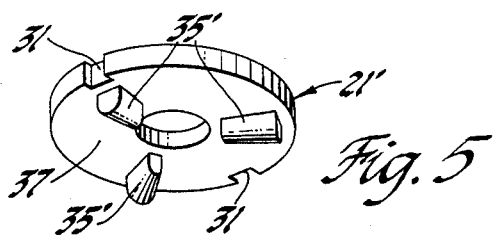
FIGS. 5 and 6 are views of alternate ribbed washers, per se, for use in a loading washer assembly; and, FIG. 7 is a sectional view of an alternate ribbed washer, per se, for use in a loading washer assembly.
Figure 6:
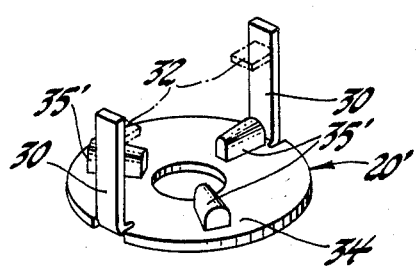

An alternate embodiment of the base and top washers, per se, for use in a loading washer assembly in accordance with the invention are shown in FIGS. 5 and 6, wherein similar parts are designated by similar numerals but with the addition of a prime (') where appropriate.

In this alternate embodiment, both the base and top washers 20' and 21', respectively, are each provided with three circumferentially spaced apart tapered ribs 35' raised relative to the inboard surfaces 34 and 37, respectively with each such rib 35' having a width and height that progressively increase from its radial inboard end next adjacent to the apertures in these washers to its radial outboard end.

It should now be apparent that with such a tapered configuration of the raised ribs 35' an associate spring 22 in a loading washer assembly having this base washer 20' and upper washer 21', during torque down of an associate threaded fastener would be bent into a wave-type conical spring which can be referred to as a wave-type Belleville spring.

Figure 7:
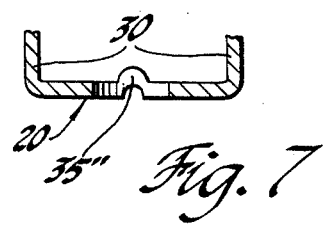

As will be apparent to those skilled in the art, the different embodiments of base and top washers shown can be fabricated, for example, as by forming the ribs 35 or 35' as separate elements which are then secured as by welding to the surfaces 34 and 37 of the washer 20 and 21 or 20' and 21', respectively. Alternatively, as shown in FIG. 7, the ribs 35", for example, as on the base washer 20 can be formed by upsetting the material of the washer itself.

While the invention has been described with reference to the structures disclosed herein, it is not confined to the specific details set forth, since it is apparent that many modifications and changes can be made by those skilled in the art. This application is therefore intended to cover such modifications or changes as may come within the purposes of the improvements or scope of the following claims.

The embodiments of the invention in which an exclusive property or privilege is claimed are defined as follows:

1. A loading washer assembly including an annular first washer provided with spaced apart ears on its outer peripheral edge, an annular second washer provided with spaced apart notches on its outer peripheral edge for slidably receiving said ears whereby to prevent relative rotation of said washers, each of said ears having return bent free end portions extending over said second washer whereby to limit the axial extent of separation of said washers, each of said first and second washers on their opposed surfaces having circumferentially spaced apart, radial extending raised ribs with said ribs on said first washer rotatively offset from said ribs on said second washer, and a normally flat spring ring interposed between said first washer and said second washer in position to be engaged by said ribs whereby said spring ring can be deformed into a wave-like spring upon axial displacement of said first washer toward said second washer.

2. A loading washer assembly according to claim 1 wherein said raised ribs are tapered so that the width and height of each said raised rib progressively increases from its radial inboard end to its radial outboard end.

3. A loading washing assembly including an annular first washer provided with spaced apart ears on its outer peripheral edge, an annular second washer provided with spaced apart notches on its outer peripheral edge for slidably receiving said ears whereby to prevent relative rotation of said washers, said ears also limiting the axial extent of separation of said washers, each of said washers on their opposed surfaces having circumferentially spaced apart, radial extending raised ribs with said ribs on said first washer rotatively offset from said ribs on said second washer, and a normally flat spring ring interposed between said first washer and said second washer in position to be engaged by said ribs whereby said spring ring can be deformed into a wave-like spring upon axial displacement of said first washer toward said second washer.

* * * * *